United States Patent [19]

Meyerle et al.

[11] 4,286,477

[45] Sep. 1, 1981

[54] STEPLESSLY ADJUSTABLE VARIABLE-SPEED HYDROSTATIC-MECHANICAL COMPOSITE TRANSMISSION

[75] Inventors: Michael Meyerle, Meckenbeuren; Otto Anton, Tettnang; Friedrich Ehrlinger, Friedrichshafen-Berg, all of Fed. Rep. of Germany

[73] Assignee: Zahnradfabrik Friedrichshafen Aktiengesellschaft, Friedrichshafen, Fed. Rep. of Germany

[21] Appl. No.: 971,420

[22] Filed: Dec. 20, 1978

[30] Foreign Application Priority Data

Dec. 22, 1977 [DE]  Fed. Rep. of Germany ....... 2757300

[51] Int. Cl.³ ............................................. F16H 47/04
[52] U.S. Cl. ...................................................... 74/687
[58] Field of Search ......................................... 74/687

[56] References Cited

U.S. PATENT DOCUMENTS

| | | | |
|---|---|---|---|
| 3,580,107 | 5/1971 | Orshansky | 74/687 |
| 3,626,787 | 12/1971 | Singer | 74/687 |
| 3,675,507 | 7/1972 | Takekawa | 74/687 |
| 3,736,813 | 6/1973 | Kress | 74/687 X |
| 3,861,240 | 1/1975 | Nolan | 74/687 |
| 3,869,939 | 3/1975 | Miyao | 74/687 |
| 3,888,139 | 6/1975 | Orshansky | 74/687 |
| 3,913,325 | 10/1975 | Miyao | 74/687 X |
| 4,008,628 | 2/1977 | Orshansky | 74/687 |
| 4,019,404 | 4/1977 | Schauer | 74/687 |
| 4,134,311 | 1/1979 | Orshansky | 74/687 |
| 4,168,637 | 9/1979 | Orshansky | 74/687 |
| 4,184,385 | 1/1980 | Maeda | 74/687 |

FOREIGN PATENT DOCUMENTS

| | | |
|---|---|---|
| 976055 | 1/1963 | Fed. Rep. of Germany . |
| 1775755 | 9/1971 | Fed. Rep. of Germany . |
| 2415002 | 12/1978 | Fed. Rep. of Germany . |
| 1265223 | 3/1972 | United Kingdom . |
| 1318943 | 5/1973 | United Kingdom . |
| 1364962 | 8/1974 | United Kingdom . |
| 1460817 | 1/1977 | United Kingdom . |

OTHER PUBLICATIONS

"Ubertragerungsantriebe", Brochure by Jean Toma.

*Primary Examiner*—Nile C. Byers, Jr.
*Attorney, Agent, or Firm*—Karl F. Ross

[57] ABSTRACT

A steplessly adjustable hydrostatic-mechanical composite transmission in which an input shaft is connected to one shaft of a multishaft summing transmission and to one unit of a hydrostatic transmission whose two units are connected in a hydraulic circuit. One of the hydrostatic units is of the variable displacement type while the other is of the constant displacement type and can be connected by selective actuation of respective clutches to two other input elements of the multishaft planetary summing transmission. The latter has, in accordance with the invention, two output members, each of which is connected to a respective input shaft of an after transmission which can be of the planetary or fixed gear pair type. The latter transmission can also be used to effect reversing of the output shaft which is driven thereby.

9 Claims, 6 Drawing Figures

STEPLESSLY ADJUSTABLE VARIABLE-SPEED HYDROSTATIC-MECHANICAL COMPOSITE TRANSMISSION

FIELD OF THE INVENTION

The present invention relates to steplessly adjustable (variable-speed) hydrostatic-mechanical composite transmissions and, more particularly, to transmission systems in which power branching is effected between a mechanical branch and a hydrostatic branch, the two branches being summed to deliver power ultimately to an output shaft.

BACKGROUND OF THE INVENTION

In composite transmissions of the above-described type, it is a common practice to provide a hydrostatic branch which comprises two hydrostatic machines or units, usually of the axial-piston type, which can be connected in a closed hydraulic circuit to form a hydraulic transmission which may provide the variable speeds or transmission ratios over each of the selected ranges of the transmission. Selection between ranges may be effected in the mechanical branch of the transmission which usually comprises a multistep or plural step summing transmission of the planetary gear type. Clutches or brakes can select the speed ranges of the mechanical transmission and, within each speed or ratio range the hydrostatic transmission can be adjustable in a stepless manner to that the overall transmission system, i.e. the composite transmission is steplessly variable from a minimum transmission ratio to a maximum.

In such systems, moreover, the clutches for speed selection may connect the second unit of the hydrostatic transmission to one or more members of the planetary-gear summing transmission and the second hydrostatic unit can be of a constant displacement type. In this case, of course, the first hydrostatic unit is of the variable displacement type. The term "displacement" is used here to refer to the fluid displacement per revolution and, naturally, the displacement represents the transmission ratio of the hydrostatic transmission or the hydrostatic branch of the composite transmission. The variable displacement unit can be shifted from a zero displacement state in opposite directions to opposite limits, referred to as the positive machine displacement and negative machine displacement, respectively, representing opposite senses of rotation of the shaft of the second or constant-displacement unit. The term "negative" is here used in the sense of a reverse rotation of the shaft or drive of the system in the reverse sense (as contrasted with forward or "positive" drive).

A composite transmission having a hydrostatic branch and a multi-shaft planetary transmission forming a summing transmission, is described, for example, in German Pat. 2,415,002 corresponding in part to U.S. Pat. No. 3,913,325.

The mechanical transmission branch is provided with a reversing transmission at its input side so that in reversing of the setting of this transmission, all of the parts of the mechanical branch connected with the input shaft must be driven even for reverse operation of the load or vehicle in which the transmission is provided. This has been found to be a significant disadvantage of this transmission since all of the rotary masses must be entrained in senses opposite their normal rotation, thereby contributing significantly to the wear of the system and to the inertia thereof.

In addition, such an arrangement requires a simultaneous compensation of the throughputs of the two hydrostatic units so that the variable-displacement hydrostatic units must be shifted from one limiting setting to the opposite limiting setting whenever the directions change is effected.

The system also operates with a jaw-type clutch which has also been found to be disadvantageous since its operation must be synchronized with the opening of both of the range-selection clutches to minimize wear of the noise and stress upon the transmission. Such transmissions have been found not to be fully effective for reversible equipment (vehicles).

OBJECTS OF THE INVENTION

It is the principal object of the present invention to provide an improved steplessly (continuously) adjustable hydrostatic-mechanical composite transmission between a motive source (prime mover) and a load (e.g. the drive train of a vehicle) whereby disadvantages of earlier systems are avoided.

Another object of the invention is to provide a stepless hydrostatic-mechanical composite transmission with improved ratio speed change and especially rapid changes in direction, e.g. from feed to speed to reverse speed, with a minimum wear and with especially high transmission factors (e.g. product of maximum output speed and maximum output torque) thereby optimizing the power/weight and power/volume ratios, i.e. the so-called specific power.

Still another object of the invention is to provide a transmission for the purposes described with improved efficiency such that the continuous or stepless control can be afforded with minimum branching through the hydraulic branch, thereby increasing the useful life of the transmission and allowing relatively small hydrostatic assemblies to be used.

There is yet a further object of the invention to provide a system for the purposes described which has reduced internal startup resistance, i.e. which eliminates or minimizes the break-loose torque of the hydraulic unit functioning as a hydraulic motor at startup of the vehicle from standstill so that the starting tractive force and the acceleration of the vehicle is improved.

An object of the invention is also to provide an improved transmission of the composite type which affords improved driving qualities when the transmission is used in an automotive vehicle.

SUMMARY OF THE INVENTION

These objects and others which will become apparent hereinafter are attained in accordance with the present invention, in a steplessly adjustable (continuously adjustable) hydrostatic-mechanical composite transmission, which is especially effective in automotive vehicles between a prime mover such as an internal combustion engine and a load such as the drive train of the vehicle, which comprises within a single housing having an input shaft and an output shaft, a hydraulic power branch consisting of two hydraulic units connected in a closed hydraulic circuit, one of which units is of the variable displacement type while the other can be of the constant displacement type, and a mechanical power branch which includes a summing transmission formed as a five-shaft planetary gear transmission having two output members which are connected, in turn, to a further transmission having two input shafts which are selectively connected with the output shafts or members of the summing transmission.

The summing transmission of the present invention is preferably formed as a planetary transmission with three mutually meshing planet gears or two meshing planet gears each in a simple or compound arrangement on a single planet carrier. The sun gears of this planetary-gear transmission can be selectively (alternatively) connected with the second hydrostatic unit of the hydrostatic transmission and the ring gears can form the output members connectible with the further transmission or after transmission. The planet carrier can form part of the mechanical power branch and the output shaft can be driven directly by the summing planetary transmission or through other members such as gear pairs which perform ratio modifying functions.

The output member of the planetary gear transmission formed by its planet carrier which can be connected by a clutch with an output member of the summing transmission so that, upon braking of the ring gear of the after transmission, the further transmission can be connected via the sun gear with the other output member of the summing transmission.

It has been found to be advantageous, both with respect to the improvement in efficiency of the system as well as with respect to the cost thereof, to form the further transmission as a four-shaft planetary gear transmission. In this case, for direction change, two of the members of this transmission can be selectively braked. Alternatively, the further transmission can be a three-shaft planetary transmission having two input shafts, a brake shaft, and an output shaft connected to the output shaft of the composite transmission.

The subsequent or further transmission can also be provided as a direction-change transmission (reversing transmission) with fixed ratio gear pairs which are selectively brought into play by actuation of respective brakes or clutches.

It has been found to be advantageous to so construct the composite transmission that, in the first speed range, the following conditions apply:

(a) For the maximum negative setting of the composite transmission or maximum possible negative output rpm for reverse driving, the hydrostatic transmission is set to maximum negative limiting setting.

(b) In the neutral condition of the composite transmission, the setting of the hydrostatic transmission is between the maximum negative setting and its zero setting, for example and preferably, 0.6 of the maximum negative setting of the hydrostatic transmission (i.e. a level of −0.6).

It has been found to be advantageous, in a further feature of the present invention to so construct the two clutches of the hydraulic power branch that they can be collectively operated, i.e. disengaged, thereby cutting off the hydraulic power branch. Alternatively, both clutches can be closed so that none of the members of the summing transmission have a negative rotation and thus the summing transmission operates as a block or unit with all parts rotating together in the same sense.

For direct power transmission between the input and output shafts of the transmission, the input shaft can be directly coupled to the output shaft of the composite transmission by a further clutch. Semidirect by passing of both the hydraulic and mechanical branches can be effected by directly connecting the input shaft of the composite transmission with an input element of the further transmission, via the same clutch or another clutch.

The steplessly adjustable hydrostatic-mechanical composite transmission of the present invention is not only of simple construction and hence economical to fabricate, but has been found to be advantageous with respect to its operating parameters and use. When, for example, the summing transmission is a five-shaft planetary transmission with two output members which work into the two input members of a further transmission, the following additional advantages are gained:

(a) stepless speed control is provided over at least four forward-speed ranges;

(b) if the further transmission (between the output shaft of the composite transmission and the summing transmission) is constituted as four-shaft planetary transmission or as a fixed gear set transmission having two input shafts, an additional two reverse speed ranges are provided;

(c) in each operating condition, hydraulic-mechanical power branching is obtained such that the hydraulic component can contribute 15% or less on the average, thereby affording excellent efficiency.

(d) high transmission factors or power ratios can be afforded so that the transmission has a low power/weight and power/volume ratio, low cost for the hydrostatic units, and comparatively high products of the maximum output speed and torque;

(e) the hydrostatic transmission is subject to a minimal or relatively low stress, especially by comparison with earlier composite transmissions;

(f) the normal hydraulic power or apparent hydraulic power of the system can be minimized;

(g) the shifting qualities of the transmission are good since continuous traction and efficiency can be maintained during speed change as well as with each speed range;

(h) the total power (input power) which can be handled by the transmission is significantly greater than the hydraulic power and indeed the total power can be at least 100% greater than the hydrostatic power;

(i) the well known disadvantages of the break-loose torque (startup torque) of the hydrostatic motor are obviated since both hydrostatic units are rotating during the startup of the vehicle and this increases the tractive force available for startup acceleration;

(j) only a single hydrostatic unit need be controlled not both; and (k) the transmission can be constructed in a particularly compact manner of considerable advantage in modern vehicle constructions.

With the composite transmission of the present invention, the hydrostatic unit is able to shift from fully negative to fully positive positions for each of the four speed ranges and in each of these ranges the power is branched between the hydrostatic and the mechanical transmissions. This gives rise especially to the advantages listed above under points (c) through (k). For reverse operation, depending upon the nature of the construction, either a conventional reversing transmission is provided to avail the user of all of the speed ranges in reverse operation or a reversing arrangement having two reverse speed ranges is obtained. In the latter case, either a four-shaft arrangement of the further planetary transmission or a corresponding mechanical transmission having paired gear sets for each direction can be used.

Alternatively, where a reduced reverse speed range is suitable in the first gear transmission, a simple three-shaft planetary can be used between the summing transmission and the output shaft or a transmission with fixed ratio gear sets can be employed with two clutches or brakes for direct selection.

A particularly compact construction suitable for most vehicle applications with the advantage of point (k) above can be obtained by a concentric arrangement of the summing transmission and its further planetary gear transmission.

It has previously been mentioned that the composite transmission of the present invention provides power branching between the hydraulic and mechanical branches which feed in parallel to the output of the summing transmission in all speed ranges. The hydrostatic transmission, of course, is connected selectively via one of its clutches to the summing transmission. The mechanical branch is effective directly through and in the summing transmission.

Because of the displacement between full negative and full positive ratios of the second hydraulic unit, an optimum increase in the transmission factor (defined as the product of the maximum output torque and maximum output rpm or as the product of the maximum starting traction and maximum speed of the vehicle) is possible. In addition, practically jolt-free transitions between speed ranges can be obtained so that the upper speed adjusted by the hydrostatic units can correspond to the lower speed of the next highest speed range.

At each speed range transition, therefore, the clutch elements which are to be actuated are driven synchronously. At each range change, a load change occurs in the summing transmission so that the hydraulic power with each upshift reverses in effect and the previous positive value becomes a negative value.

In addition, when the output element of the hydrostatic transmission is operated at about 0.6 of the way between its zero position and its full negative position ($-1$) a break-loose torque is not required in shifting from the neutral of the composite transmission to start the vehicle. In conventional systems, the break-loose torque may reduce the tractive force on startup by about 15%.

In many applications of the system of the present invention it may not be necessary to use the fourth speed range since the third speed range can give a doubling of the transmission factor with respect to that of the second speed range. It is thus possible to provide at the end of the third speed range a synchronous running (joint running) of all of the elements subjected to mechanical torque and thus to relieve the hydrostatic transmission completely from any power branching function. This can be effected by shunting the hydraulic circuit by a shunt valve bridged across the ports of the two units. This construction has been found to be effective for vehicles that can be operated at high speeds. It also may be advantageous at the end of the first speed range to effect this direct power transfer, e.g. in the case of industrial or agricultural machines which preferably operate in this speed region.

For vehicles which are to use all four speed ranges, a clutch may be provided for the direct connection of the input shaft with the output shaft for direct drive bypassing all of the transmission elements. This operating condition can be automatically switched in when the input and output shafts reach synchronous speeds.

The effect of operating with a reduced reverse speed capability, when the neutral position of the composite transmission corresponds to a setting of $-0.6$ of the variable displacement unit of the hydrostatic transmission, will be apparent from our concurrently filed copending application Ser. No. 971,566 commonly assigned herewith and which is incorporated herein entirely by reference.

BRIEF DESCRIPTION OF THE DRAWING

The above and other objects, features and advantages of the present invention will become more readily apparent from the following description, reference being made to the accompanying schematic or diagrammatic drawing in which.

SPECIFIC DESCRIPTION

Figure 1:
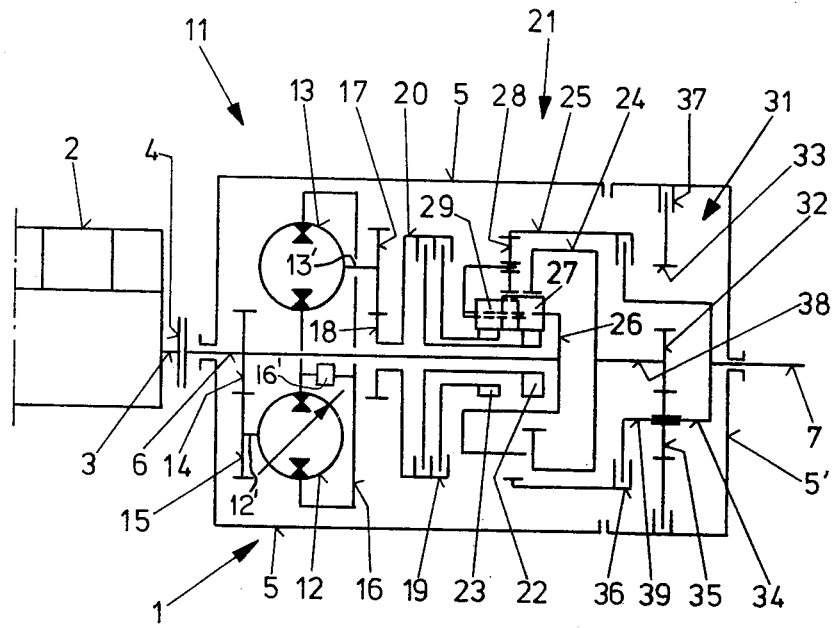
FIG. 1 shows a hydrostatic transmission and a summing transmission in a composite transmission according to the invention in which the further transmission is a three-shaft planetary unit.

FIG. 1 shows a composite transmission 1 having an input shaft 6 connected by a coupling 4 (e.g. a clutch, a flexible coupling, a torque converter or any like rotation-transmitting element) to the crankshaft 3 of a motive power source such as the internal combustion engine 2.

The housing 5 of the composite transmission is provided with a hydrostatic transmission 11 and a five-shaft planetary transmission 21 forming the summing transmission. In addition, an after transmission 31, also formed as a planetary, is provided between the summing transmission 21 and the output shaft 7. The power supplied via shaft 6 is thus divided between hydraulic and mechanical branches.

The hydraulic branch includes the hydrostatic transmission 11 which comprises a first hydrostatic machine or unit 12 of variable displacement type and a second hydrostatic machine or unit 13 of the constant displacement type. These units have respective shafts 12', 13' and the shaft 121 of the first unit 12 is provided with a pinion 15 meshing with a gear 14 on the shaft 6.

The two units are connected in a closed hydraulic circuit 16 which can be provided with a shunt valve 16' as described in the aforementioned copending application.

The power of the hydrostatic transmission 11 is recovered by a gear 17 connected to a shaft 131 of the second unit 13 which gear 17 meshes with a gear 18 driving the rotary member of a pair of clutches 19 and 20 which, when respectively engaged, drive the sun gears 22 and 23 of the summing transmission 21.

The mechanical power flow is directly to the summing transmission 21 or via gear pairs of any desired ratio or for direct-change purposes (not shown). In the embodiment illustrated, the planet carrier 26 is rigid with the shaft 6 and has planet gears 27, 28 and 29 which mesh with the sun gears 22 and 23. The output elements of the summing transmission 21 are the ring gears 24 and 25.

The after transmission 31, which is constituted as a planetary coaxial with the summing transmission 21, comprises a sun gear 32 which is connected with the ring gear 24 via an input shaft 38.

The planet carrier 34 of the after transmission 31 is connected to the output shaft 7 of the transmission. A clutch 36 can connect a further input shaft 39 with the output element or ring gear 25 of the summing transmission 21. A brake 37 can be actuated to immobilize the ring gear 33 of the after transmission.

The output of the composite transmission 1 is obtained in the first and second speeds via the planetary transmission 31. With a closed brake 37, the sun gear 32 and the planet carrier 34 can be driven. When the clutch 36 is open, the ring gear 25 rotates in an unloaded state. At the end of the second speed range, the ring gear 25 and the parts of the clutch 36 rotate synchronously with the planet carrier 34 of the after transmission 31. In the third speed range the clutch 36 is closed and the brake 37 is disengaged. A load transfer is effected from the ring gear 24 to the ring gear 25 which is thus connected directly with the output shaft 7. Further speed increase is effected by setting back the hydrostatic unit to a zero position and then to its full positive end setting. In this setting, all of the members of the summing transmission 21, the clutches 19 and 20 and the planetary transmission 31 are in synchronous operation. Shifting into the fourth speed range is then effected by de-energizing clutch 20 and energizing clutch 19 with the brake 37 closed.

To attain the maximum speed position of the transmission, the hydrostatic unit is then adjusted from its positive limiting position to its negative limiting position.

The hydrostatic transmission 11 provides four speed ranges with complete adjustability between its negative and positive limits in the following four conditions of the transmission:

Speed range 1 via clutch 19 and brake 37.
Speed range 2 via clutch 20 and brake 37.
Speed range 3 via clutch 20 and clutch 36.
Speed range 4 via clutch 19 and clutch 36.

Figure 2:
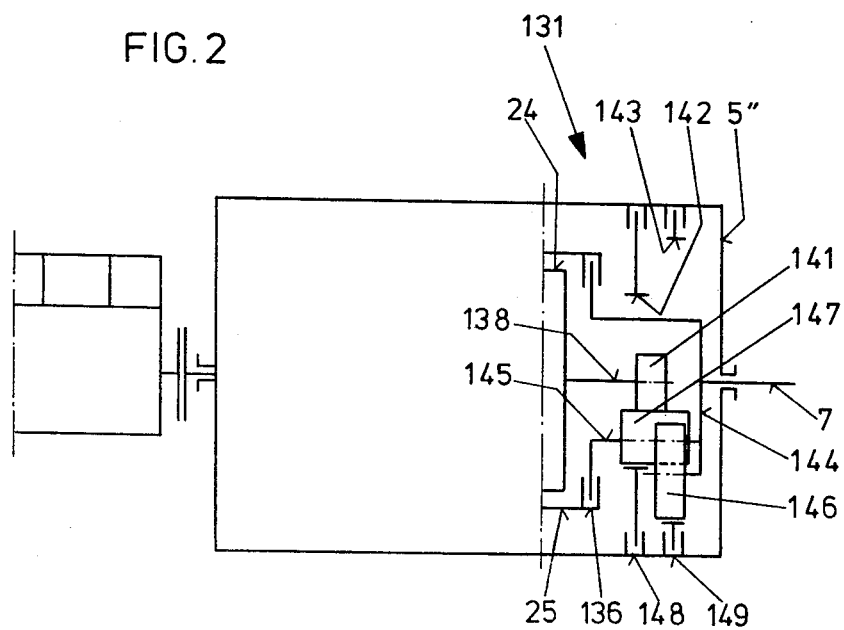
FIG. 2 is a view of a portion of the composite transmission of FIG. 1 modified to use a four-shaft planetary transmission with two reverse speed ranges as the further transmission.

In the embodiment of FIG. 2, the after transmission 131 is a four-shaft planetary between the summing transmission 21 and the output shaft 7. This arrangement provides, apart from four forward speed ranges, two reverse speed ranges.

To render the reverse speed ranges effective, the ring gear 24 is connected to the sun gear 141 via one input shaft 138 while the planetary gear 147 meshes with a further planetary gear 146 reversing the sense of rotation of the output shaft 7 and meshing with both the ring gear 143 as well as with planetary gear 147.

When the ring gear 143 is immobilized by the actuation of brake 149, the power flow for reverse operation is effected via the sun gear 141, the planetary gear 147, the further planetary gear 146 and the planet carrier 144, 145 of the transmission 131, to the output shaft 7. Brake 148 is provided to immobilize the ring gear 142. In the first two forward speed ranges, the power flow is effected via the sun gear 141 to the planet gear 147 and the carrier 141 which is connected to the output shaft 7, the second planetary gear 146 and the ring gear 143 being unloaded.

The planet carrier 145 forms a further input shaft of the after transmission 131 and can be connected by the clutch 136 with the ring gear 25 for the third and fourth speed ranges of the output shaft 7. All of the other members of the planetary transmission 131 are unloaded.

The transmission of FIG. 2 thus forms a unit with four forward and two reverse speed ranges with the reverse speed ranges corresponding to the first and second forward speeds.

If, in reverse, a reduced starting traction is desirable, the reverse speed corresponding thereto can be increased by an increase in the ratio between the ring gear 143 and the sun gear 14. Naturally, the starting traction in the reverse speed ranges varies inversely with the reverse speed magnitude. It is thus possible to provide optimum forward and reverse speeds as well as optimum forward and reverse tracks as required.

In the reverse speed range the hydrostatic transmission 11 can be shifted twice over the full range between its negative and positive limiting sets as in the first and second forward speed ranges. The speed control elements are thus effective as follows:

FORWARD:
Speed range 1 via clutch 19 and brake 148.
Speed range 2 via clutch 20 and brake 148.
Speed range 3 via clutch 20 and clutch 136.
Speed range 4 via clutch 19 and clutch 136.
Reverse:
Speed range 1 via clutch 19 and brake 149.
Speed range 2 via clutch 20 and brake 149.

The planetary transmission units 31 or 131 can be provided as complete structural assemblies with the respective clutches or brakes 36, 37 or 136, 148, 149, with respective housings as diagrammatically represented at 5' and 5" so that they can be assembled to the remainder of the transmission housing interchangeably. This increases the versatility of the composite transmission systems.

Figure 3:
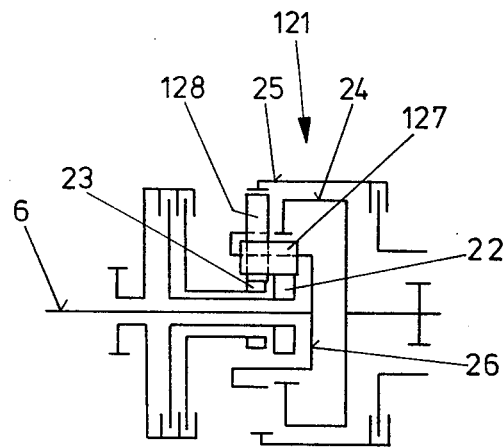
FIGS. 3 and 4 show a five-shaft planetary transmission which can be used in place of systems of the type illustrated in FIGS. 1 and 2.
Figure 4:
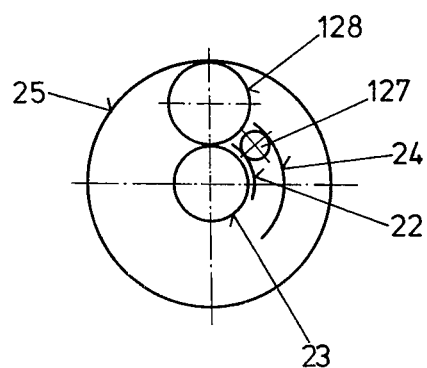

The summing transmission 121 illustrated in FIGS. 3 and 4 is constituted as a five-shaft planetary transmission except that it has two mutually meshing planetary gears 127 and 128.

The function of this summing transmission is identical with that of FIG. 1. The difference is only that the second planetary gear 128, which meshes with the first planetary gear 127, directly meshes in the output ring gear 25 as well as with the sun gear 23.

Figure 5:
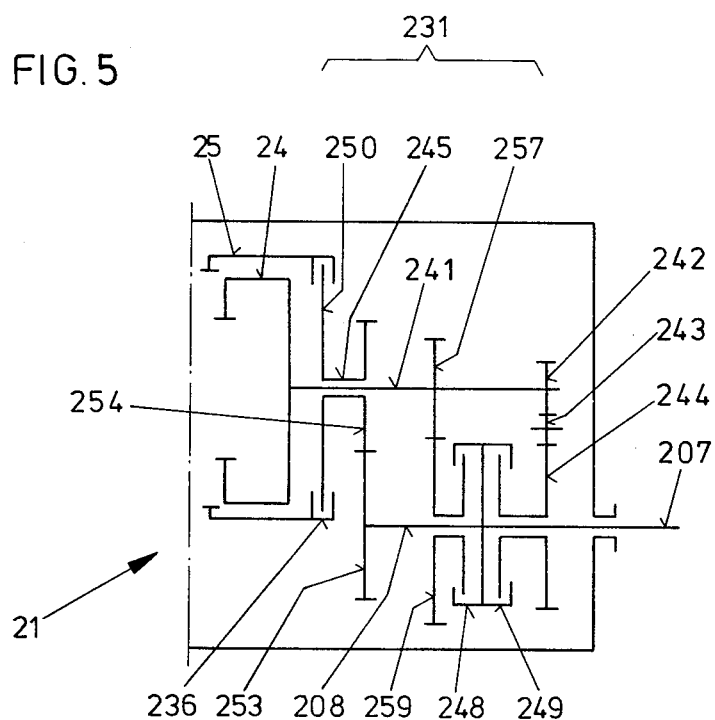
FIG. 5 illustrates an embodiment of the invention in which a transmission having fixed gear pairs is used as the further transmission.

In FIG. 5, we have shown an after transmission 231 which can be used in the combination with the summing transmission of FIG. 1, which is constituted as a fixed gear pair transmission with the respective gear pairs being selected by clutches or brakes.

The transmission 231 fulfills the same functions as the four-shaft transmission (planetary) of FIG. 2.

In the first and second speed ranges the power is transmitted via the output member 24 of the summing transmission 21 or 121 to the first input shaft 241 of the transmission 231 and is transferred via the meshing gears 257 and 259, upon closure of clutch 248, to the single output shaft 207.

The shaft 207 is connected with the shaft 208 via the gears 253 and 254 to rotate the second input shaft until the clutch member 250 connected with the second shaft 245 run synchronously with the ring gear 25 of the summing transmission 21. Upon closure of clutch 236 and opening of clutch 248, power transfer is effected from the ring gear 24 to the ring gear 25 of the summing transmission 21. The power is now delivered via the clutch 236, the gear pair 253, 254 and the shaft portion 208 to the output shaft 207.

In this embodiment, apart from the four forward speed ranges, two reverse speed ranges are also possible and to this end, the first input shaft 241 can be provided with a further gear 242 which meshes with an idler 243 driving the pinion 244. The latter pinion can be connected by a clutch 249 with the output shaft 207. Thus when power is branched via the first ring gear 24, the two speeds of the summing transmission corresponding thereto can be applicable, by selective operation of clutches 248, 249 for forward speed of the output shaft 207 or reverse speed thereof.

In the embodiment illustrated in FIG. 6, the after transmission 331 is again shown as a fixed gear pair transmission with clutches 348, 336 for connecting the first and second output members of the summing transmission 121 to the output shaft 307, as well as a clutch 349 for the reverse drive of this shaft as described in connection with FIG. 5.

Within the first and second drive ranges, therefore, the power from the driven ring gear 24 of the summing transmission 121 is applied to the first input shaft 341 and is thus delivered to the gears 357 and 359 when the clutch 348 is closed, to operate the output shaft 307.

In the two reverse speed ranges, the power from the ring gear 24 applied to shaft 341 is transferred to the output shaft 307 via the meshing gear assembly 355, 358, 356 and the closed clutch 349.

At the end of the second forward speed range, the ring gear 25, via the pinions 354 and 353 and the shaft 308 driven by the output shaft 307, possesses a synchronous speed so that closure of clutch 336 and opening of clutch 348 is possible to effect a load transfer from ring gear 24 to the ring gear 25 of the summing transmission 121. The power is now delivered via the gear pair 354, 353 and the shaft 308 via the clutch 336 to the output shaft 307.

This transmission system has still another device for direct power transfer between the input and output shafts, i.e. at the end of the fourth speed range. In this case, a connection between the shaft 308 and the input shaft 6 is effected via the gear pair 351, 352 and a clutch 354 driving the output shaft 307 and to bypassing both the summing transmission and the after transmission as well as the hydrostatic transmission.

Figure 6:
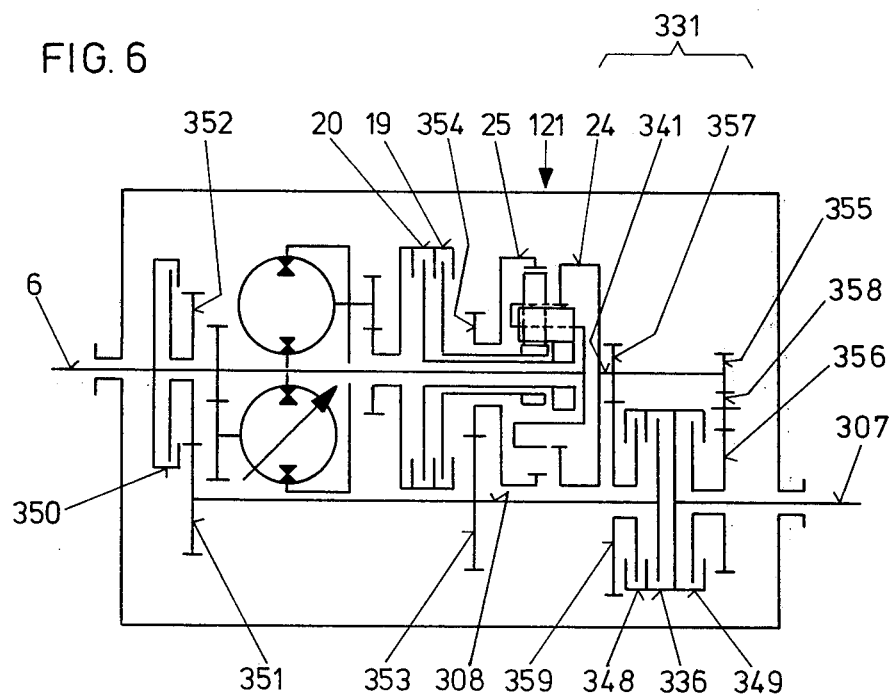
FIG. 6 shows a modification of the embodiment of FIG. 1 utilizing a transmission with fixed-ratio gear pairs as the further transmission as well as a means for direct drive of the output shaft from the input shaft.

The shifting arrangements of FIGS. 5 and 6 are identical with the embodiment of FIG. 2 whereby the clutches 236, 248 and 249 of the embodiment of FIG. 5 as well as the clutches 336, 348 and 349 of the embodiment of FIG. 6 correspond to the clutches 136, 148 and 149 in operation.

We claim:

1. A stepless hydrostatic-mechanical composite transmission, comprising:
    an input shaft and an output shaft connectible respectively to a source of motive power and to a load;
    a hydrostatic transmission having two hydraulic machine units connected in a hydraulic circuit and each being provided with a respective shaft, a first of said units being of a variable-displacement type adjustable between a full negative setting and a full positive setting past a zero setting;
    a multishaft coaxial summing transmission having a first shaft connected to said input shaft, a second shaft, a third shaft, and gearing connecting said first, second and third shafts;
    means connecting a shaft of one of said units to said input shaft, said summing transmission having a pair of output elements;
    respective coaxial clutches connecting a shaft of the other of said units selectively to second and third shafts of said summing transmission, said coaxial clutches being simultaneously actuatable to effect rotation of said first, second and third shafts and said gearing as a unit;
    an after transmission having two further input shafts, an output member connected to said output shaft, and gearing connecting said further input shafts with the output member of said after transmission; and
    clutch means selectively connecting each of said output elements to a respective one of said further input shafts of said after transmission.

2. The composite transmission defined in claim 1 wherein said summing transmission is a five-shaft planetary transmission having at least two meshing planetary gears, respective sun gears connected via said clutches with said second unit and formed with said second and third shafts, respectively, and respective ring gears forming said output members.

3. The composite transmission defined in claim 1 wherein said after transmission is a planetary gear transmission having a planet carrier forming said output element and connected to said output shaft, said composite transmission further comprising a clutch connecting one of said output elements with said planet carrier of said after transmission.

4. The composite transmission defined in claim 3 wherein said after transmission is a four-shaft planetary gear transmission provided with means for reversing the sense of rotation of said output shaft in at least two speeds of the composite transmission.

5. The composite transmission defined in claim 2 wherein said after transmission is a three-shaft planetary transmission.

6. The composite transmission defined in claim 2 wherein said after transmission has a plurality of pairs of gears and respective clutches for selectively rendering the pairs of gears effective.

7. The composite transmission defined in claim 2 which has a first speed range in which in a maximum negative setting of the composite transmission, the variable displacement unit of the hydrostatic transmission is set at its maximum negative setting, and in the neutral condition of the composite transmission, the variable displacement unit is set at about 0.6 of the maximum negative setting of the hydrostatic transmission.

8. The composite transmission defined in claim 1 wherein said clutches are simultaneously engageable and disengageable.

9. The composite transmission defined in claim 1, further comprising means for directly coupling said input shaft to said output shaft.

* * * * *